United States Patent [19]

Wikholm

[11] 4,022,688
[45] May 10, 1977

[54] METHOD AND DEVICE FOR SEPARATING EMULSIONS

[76] Inventor: Karl Oskar Wikholm, Bergtorpsvägen 62, 183 64 Taby, Sweden

[22] Filed: Dec. 16, 1975

[21] Appl. No.: 641,590

[30] Foreign Application Priority Data

Dec. 16, 1974 Sweden .............................. 7415795

[52] U.S. Cl. ............................ 210/71; 210/73 W; 210/84; 210/138; 210/187; 210/262; 210/519; 210/522; 210/540

[51] Int. Cl.² ...................... B01D 35/18; C02B 1/02

[58] Field of Search ............ 210/23 R, 73 OW, 83, 210/84, 71, 187, 182, 261, 262, 519, 538, 540, 522, 72, 102, 138, 139, 176; 23/267 MS

[56] References Cited

UNITED STATES PATENTS

| | | | |
|---|---|---|---|
| 1,176,775 | 3/1916 | Morris | 23/267 MS |
| 1,663,651 | 3/1928 | Green | 210/519 |
| 1,800,965 | 4/1931 | Spalding | 210/522 |
| 1,922,714 | 8/1933 | Ridley | 210/519 |
| 2,624,462 | 1/1953 | Williams | 210/519 |
| 2,758,720 | 8/1956 | Van Dijck | 210/23 R |
| 2,771,997 | 11/1956 | Unthank | 210/519 |
| 2,772,781 | 12/1956 | Unthank | 210/519 |
| 2,866,558 | 12/1958 | Eckert | 210/540 |
| 3,478,874 | 11/1969 | McLean et al. | 210/23 R |
| 3,731,802 | 5/1973 | James | 210/71 |

Primary Examiner—Frank W. Lutter
Assistant Examiner—Frank Sever
Attorney, Agent, or Firm—Wenderoth, Lind & Ponack

[57] ABSTRACT

A system for separating emulsions containing water, an emulsifying agent, petroleum products and possible contaminants, wherein emulsion is fed under controlled laminar flow into at least one separation chamber containing previously separated water and a petroleum layer floating thereon. The emulsion is fed into the separation chamber immediately below the petroleum layer, while the temperature of the emulsion is maintained above the temperature of the previously separated water. The emulsion is thus caused to propagate freely and horizontally in a thin layer between the petroleum layer and the previously separated water, whereby the emulsion self-separates while being substantially stagnant.

28 Claims, 6 Drawing Figures

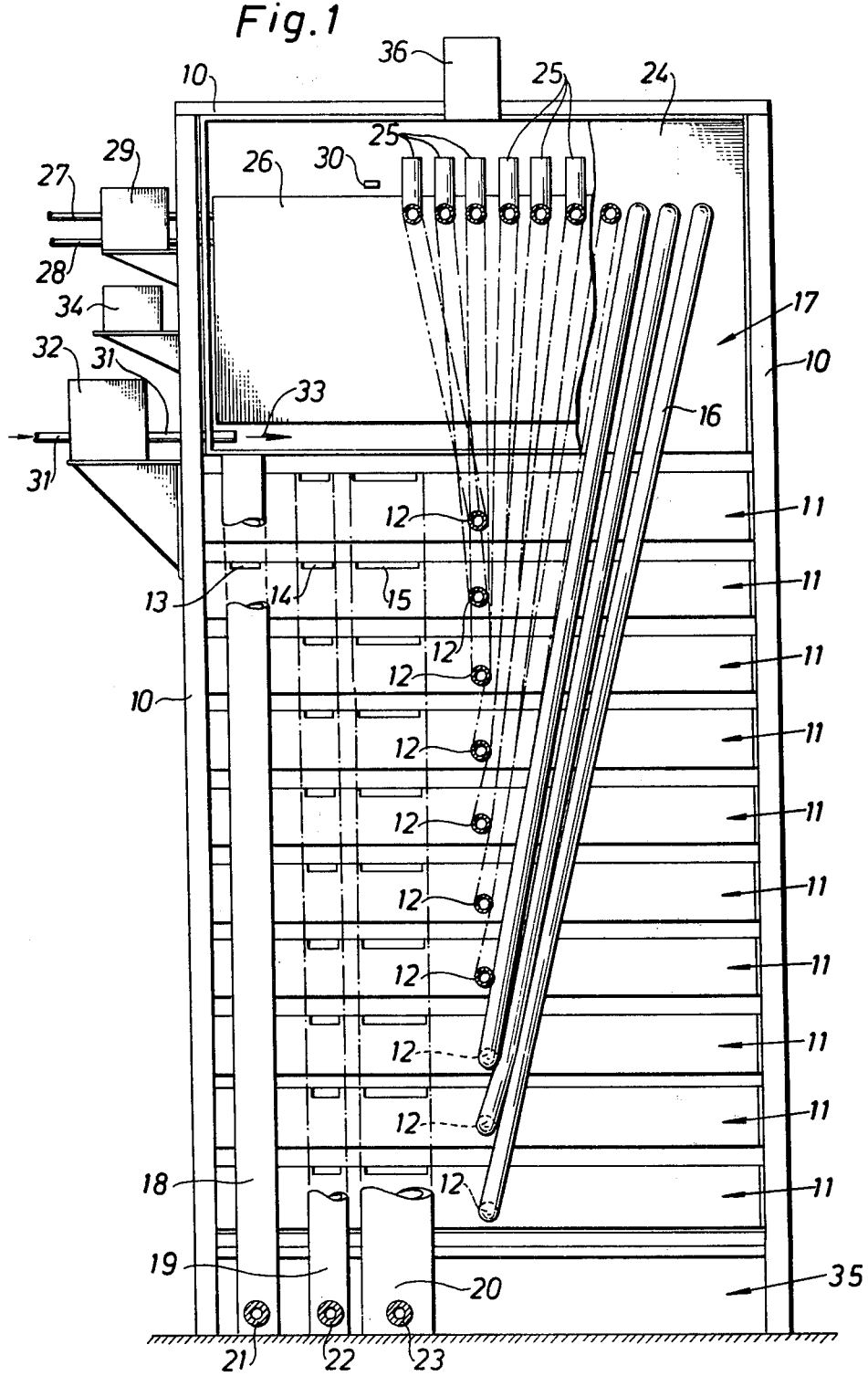

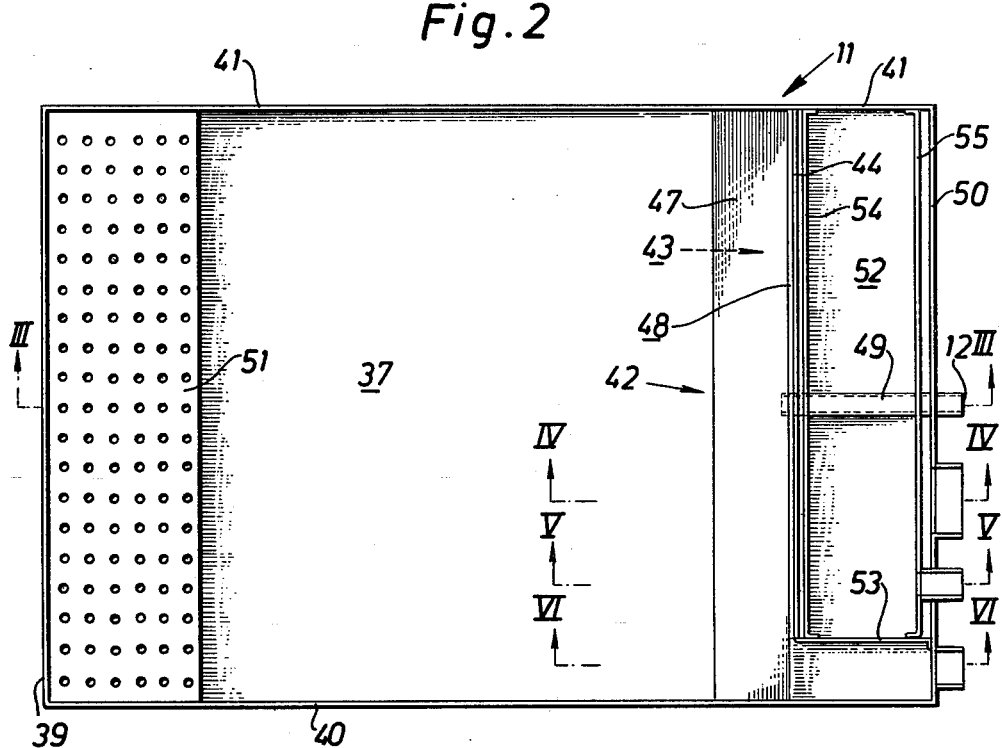
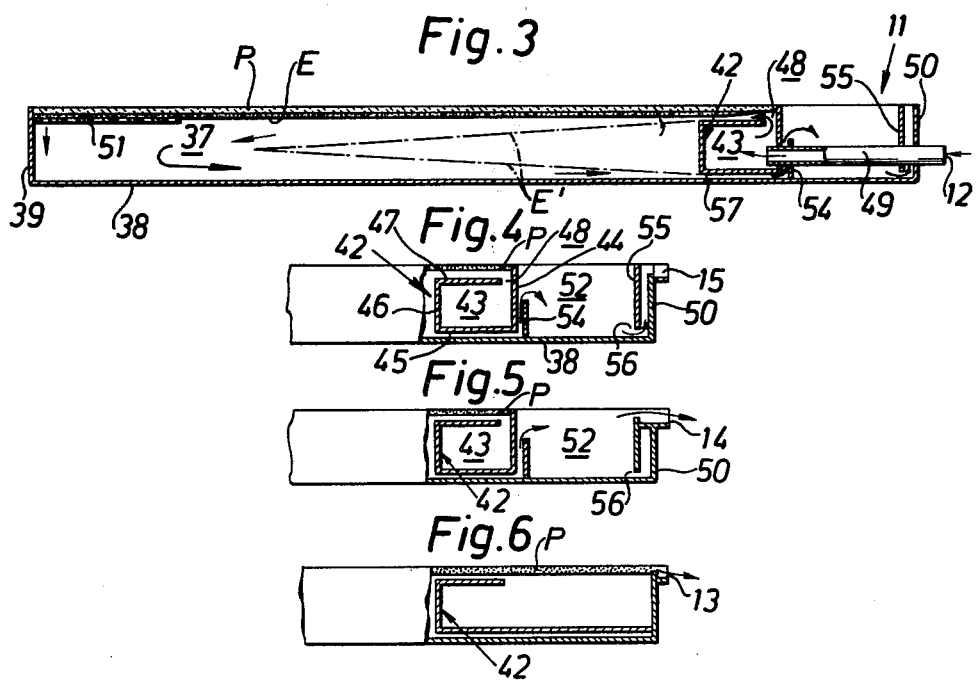

METHOD AND DEVICE FOR SEPARATING EMULSIONS

BACKGROUND OF THE INVENTION

The present invention relates to a method and apparatus enabling a comparatively quick segregation of petroleum products, particularly from liquid mixtures containing mostly water but also an emulsifying agent, the petroleum products and possibly also other lighter liquid components forming an emulsion together with the water and the emulsifying agent.

The presently known methods of separating emulsions in a more or less controlled way are heating, chemical break-down, centrifugal techniques, the use of ceramic filters or (most frequently) a combination of such measures. In relation to capacity, such systems are very expensive and involve high operational costs.

As opposed to these methods, the inventive method is based on the fact that emulsions containing water and petroleum break down into their components as soon as the emulsion is formed, a phenomenon referred to below as self-separation.

The basic problem to be solved by the invention is to avoid the discharge of dispersed petroleum products into draining systems ending at purifying plants. In fact, petroleum has a deleterious influence on the biological part of a purifying plant and, in pace with the development of purifying plants, more and more attention has been paid to this problem.

Emulsion containing petroleum products are extensively used particularly at industrial plants, petrol stations and motor repair shops. In order to remove oil, grease, asphalt wax, polish or similar products from vehicles, engines, polished stainless parts etc., one normally uses cleaning liquids comprising white spirit with high contents of aromatics and an emulsifying agent added thereto. After washing with water, an emulsion having a density very close to that of water is formed and consequently, such an emulsion cannot be separated in conventional oil separators. If the emulsion is discharged through an oil separator containing previously segregated oil this oil will be emulsified and follow the water through the outlet.

The authorities have also drawn their attention to this problem, and efforts are now being made to establish standards relating to such cleaning liquids forming emulsions. It has been proposed to permit only such cleaning liquids which upon mixing with prescribed quantities of polish, lubricating oils, anti-rust agents, etc. and dilution in water into an emulsion, separate spontaneously within a prescribed time period to such an extent that the remaining contents of petroleum fall below a certain limit value, e.g. 100 ppm, which is also the maximum value to be permitted for discharge into draining systems leading to purifying plants.

The problem is, however, that hitherto no method has been found which enables the self-separation of an emulsion in large quantities and which is sufficiently simple, reliable in operation and cheap to be applicable at petrol stations, motor repair shops and minor industrial plants.

SUMMARY OF THE INVENTION

The inventive method makes use of the principle known from conventional oil separators and similar devices (see e.g. British patent specification No. 252,077 and U.S. Pat. No. 3,804,242), 804 namely by feeding under laminar flow the liquid mixture to be separated into at least one separation chamber containing previously separated water and a layer floating thereon, the layer consisting of previously separated petroleum, whereupon the liquid mixture self-separates under the influence of gravity, so that the lighter components aggregate at the petroleum layer, the uppermost part of the layer being successively removed, preferably by means of an overflow outlet, and the water content intermixes with the previously separated water and successively let out through an outlet opening at the bottom of the separation chamber.

However, the invention relates to the separation of liquid mixtures in the form of emulsions, and special measures are therefore necessary to avoid too long a duration of the self-separation process. Consequently, if one were to use anyone of the known devices operating according to the above-mentioned principle, for separating an emulsion the emulsion would immediately intermix with the entire quantity of previously separated water, and the lighter petroleum products to be separated would therefore have to rise from all parts of the separation chamber beneath the petroleum layer and, thus, also from the bottom portion of the chamber. Such a process requires a long time, at least as far as the smallest drops are concerned. The smaller an emulsion drop, the less its buoyancy, and the rising movement will be correspondingly inclined to be disturbed by other flows in the liquid. Consequently, the self-separation process will be quickest if the emulsion is stationary, but even under optimum conditions in this respect, the time of separation is substantially proportional to the maximum rising height of the drops. The importance of a stationary liquid is evident upon realizing that the rise time of the smallest drops is decisive for the separation time required for reaching the prescribed limit of petroleum contents in the waste water.

With regard to these circumstances it is proposed, according to the invention, to feed the emulsion into the separation chamber, under laminar flow through the chamber inlet, immediately below the petroleum layer, while keeping the temperature of the emulsion flowing into the chamber above the temperature of the previously separated water, and to let the emulsion propagate freely and horizontally while forming a thin, continuous emulsion layer between the petroleum layer and the previously separated water, and to let such emulsion layer self-separate while being substantially stagnant. Hereby, the time of separation will be considerably reduced.

In practice, the difference in temperature between the emulsion and the previously separated water is preferably achieved by heating the emulsion before feeding it into the separation chamber. The difference in temperature will cause a corresponding density difference whereby the emulsion layer will easily float on the water without being intermixed therewith.

To avoid turbulence and intermixing phenomena, it is preferable to feed the emulsion through an inlet passage, the opening of which extending or being divided horizontally and laterally relative to the flow direction, and to stop the feeding of the emulsion before or when the emulsion layer reaches the nearest opposite wall of the separation chamber, whereupon the emulsion layer is permitted to self-separate during a period of stagnation. To enable quick separation of large amounts of emulsion, it is most advantageous to arrange several, preferably box-like separation chambers of minor height, one on top of the other, so as to form a unit having a large capacity in relation to its volume.

The exact features of the method and the device according to the invention are presented in the subsequent claims.

BRIEF DESCRIPTION OF THE DRAWINGS

Further features and advantages will be apparent from the following description with reference to the attached drawings, which show, as an example, an embodiment of an emulsion separation device according to the invention.

FIG. 1 is an end view of an apparatus according to the invention comprising several separation units disposed one on top of the other.

FIG. 2 is a top view of one of the separation units of the apparatus.

FIG. 3-6 are vertical sections respectively taken along the lines III—III, IV—IV, V—V and VI—VI in FIG. 2.

DETAILED DESCRIPTION OF THE INVENTION

The apparatus illustrated in FIG. 1 comprises an iron frame structure and a box-like casing 10 having a height of about 2 m, a width of about 1 m and a length of about 2 m. The casing is made of a thermally insulating material covered with sheet metal at the outside. The major part of the box-like space inside the casing houses several identical separation units 11 disposed one on top of the other, each unit consisting of a box-like metal container, which is open at the top (compare also FIGS. 2 and 3) and has a height of about 12.5 cm, a width of about 1 m and a length of about 1.5 m, the metal containers being supported by the frame structure. Each separation unit 11 has at one of its end walls an inlet opening 12 and three overflow outlets 13, 14 and 15 (to be described further below). The inlet openings are individually connected to corresponding essentially vertical feed pipes 16 disposed between the respective inlet openings and a feed container 17 placed at the top of the apparatus so as to substantially fill the space above the separation units inside the casing. The overflow outlets are connected to three collecting pipes 18, 19 and 20, which are disposed vertically in front of the sets of overflow outlets 13, 14 and 15 and provided with outlet openings 21, 22 and 23, respectively, at the lower parts thereof.

The upper portions of the feed pipes are drawn through the end wall 24 of feed container 17 and have their upper open ends 25 within the feed container, all these open ends being situated at the same level. Inside the feed container, there is also a heating device in the form of a battery of hot water elements (schematically indicated at 26) connected to a hot water source, such as a heating boiler (not shown), via feed and return pipes, 27 and 28, respectively.

The flow through the battery of hot water elements is adjusted by means of a magnetic valve 29 which is controlled by a temperature sensor member (schematically indicated at 30) situated somewhat below the level of the open upper ends 25 of the feed pipes. The magnetic valve 29 and the temperature sensor member 30 form a thermostatic unit which is adjustable by means of a control member (not shown but preferably situated outside the casing), so that the temperature inside the feed container 16 can be kept within a narrow interval above the ambient temperature, e.g. between 40° and 43° C.

A feed pump (schematically indicated at 32) is installed in a conduit 31, which is connected to a non-illustrated surge tank, and on the pressure side of the pump the conduit is drawn through the casing of the apparatus and the feed container wall and has its open end within the lower portion of the feed container adjacent the arrow 33 indicating the flow of liquid into the container. The pump 32 is controlled, on the one hand, by the temperature sensor member 30 permitting the pump to operate only when the temperature in said feed container is within the chosen temperature interval and, on the other hand, by an adjustable timer 34 ensuring intermittent operation of the pump, so that it operates with constant power during a controllable feed period and is kept idle during a following, likewise adjustable rest or stagnant period.

From above mentioned non-illustrated surge tank, the purpose of which is to collect the emulsion to be separated, and, if needed, to separate heavier liquid and solid components which follow the emulsion but do not belong to it, the emulsion is pumped into the lower portion of the feed container 17 (arrow 33) so that the level of the liquid surface rises above the upper open ends 25 of the feed pipes. During the feed period, which may last for e.g. 1–5 minutes, in the present case preferably about 3 minutes, the emulsion flows freely, in equally large quantities (each of about 10–15 liters), through the feed pipes 16 and the respective inlet openings 12 of the separation units. As will be explained below, the emulsion flows into a separation chamber in each separation unit 11, which chamber contains previously separated water and a layer of petroleum products floating thereon. Upon entering very slowly into the chamber, the emulsion propagates in the form of a layer floating between the petroleum layer and the previously separated water. At the end of the feed period, when the pump has been switched off, the feeding of emulsion stops, and during the following rest period, when the flow in each chamber quickly stagnates to a stand still, the thin emulsion layer separates spontaneously and lighter components of the emulsion are merged into the petroleum layer, whereas the water content of the emulsion is mixed with the previously separated water. This process is repeated cyclically, and during each feed period the petroleum layer and the separated water in each separation unit will be discharged via the overflow outlets 13 and 14, respectively.

Thus, separated petroleum flows through the collecting pipe 18 via the outlet opening 21 into an external container (not shown) or, preferably, into a storage tank (schematically indicated at 35) disposed at the bottom of the apparatus. The storage tank is emptied regularly into a tank truck or the like for carrying away the contents which cannot be discharged into local draining systems. The storage tank could possibly be provided with a level indicator, e.g. a visible overflow pipe, to enable supervision of the apparatus. It is also suitable to arrange an automatic overflow detector, which controls the feed pump 32 so as to make it inoperative, in case the storage tank is totally filled and also provides an alarm signal indicating such a condition.

The separated water is discharged via the overflow outlets 14 and 15. The water discharged from the outlets 14 may contain a larger percentage of non-demulsified emulsion than the water from the outlets 15 due to the structure of the separation units, as will be explained in detail below. The possibly incompletely demulsified liquid from the outlets 14 flows into the collecting pipe 19 and may either be fed back to the surge tank or directly to the feed container 17 or collected in a special tank for reuse of the liquid, e.g. for washing details which have been cleaned with an emulsifying cleaning liquid. The purified water from outlets 5 contains, however, such a low percentage of petroleum that it can be discharged directly to a local training system via the outlet 23 of collection pipe 20.

The short-end of the box-like apparatus shown in FIG. 1 has preferably (instead of the casing) a closure end wall (not shown) which can be opened from its normally closed position, such as a door or gate. The vital parts of the apparatus are otherwise protected by the casing 10, on the outside of which there are only a ventilating duct 36 extending through the top wall (in order to remove highly inflamable gases which may appear in the apparatus), the thermostatically controlled magnetic valve 29 and its associated control member, the likewise adjustable timer 34, the feed pump 32, and the various pipes.

Further details of the structure and function of the individual separation units 11 will be given below with reference to FIGS. 2–6.

As mentioned above, each separation unit consists of a sheet metal container 11 having larger horizontal than vertical dimensions. The separation chamber 37 itself is defined by the bottom wall 38 of the container, the left (as seen in FIGS. 1 and 2) end wall 39, the side walls 40, 41, and to the right in FIGS. 1 and 2, a bent partition wall metal sheet 42, the latter forming a substantially closed distribution chamber 43 extending across the width of the metal container. The bent sheet 42 is sealingly connected to the side walls 40 and 41 and comprises a rear, vertical portion 44 (see FIG. 4), which extends from the level of the upper edges of the outer side walls 39–41 to a level slightly above the bottom wall 38; a lower, horizontal portion 45 adjoining the rear, vertical portion 44; a frontal, vertical portion 46 adjoining horizontal portion 45; and an adjoining upper, horizontal portion 47 situated slightly below the upper edge of rear portion 44 and ending at a short distance from rear portion 44, so that a slot-like passage 48 is formed therebetween.

A perforated metal sheet 51 is disposed at the left (as seen in FIGS. 1 and 2) end of the separation chamber approximately at the same level as the upper portion 47 of the bent sheet 42.

The above-mentioned inlet opening 12 of the separation unit is constituted by an end portion 49 of the feed pipe 16, such end portion extending through the right (as seen in FIGS. 2 and 3) end wall 50 of the metal container and through the rear portion 44 of the bent sheet 42 into the distribution chamber 43.

The right end portion of the separation unit 11 comprises an auxiliary separation chamber 52 being defined by the right end wall 50 of the metal container, the rear, vertical portion 44 of the bent sheet 42, one of the side walls 41, and a partition wall 53, the latter being parallel to the side walls (below and to the right in FIG. 2)

Between the side wall 41 and partition wall 53, two vertical deflecting baffles 54 and 55 are arranged in the auxiliary separation chamber. A first (54) of these baffles extends from the bottom wall 38 at some horizontal distance from rear portion 44, whereas a second baffle 55 extends through the upper portion of the chamber at some distance from the end wall 50. Second baffle 55 terminates somewhat above the bottom wall 38, so as to form a lower passage 56 between the bottom wall 38 and the lower edge of the baffle 55.

The auxiliary separation chamber 52 is provided with two overflow outlets, namely the above-mentioned outlets 14 and 15 for separated water. The outlet 14 (see FIG. 2 and 5) leads from the upper portion of the auxiliary separation chamber, this upper portion being situated between the deflection baffles 54 and 55, whereas the outlet 15 (see FIGS. 2 and 4) leads from the lower portion of the chamber via the lower passage 56.

The upper portion of the separation chamber 37 extends at one of the corners of the separation unit (the lower right corner in FIG. 2) all the way to the end wall 50 (see FIG. 6), where the above-mentioned overflow outlet 13 for separated petroleum is situated.

As described above, the emulsion is fed through the inlet opening 12 during the flow period and, consequently, through the end portion 49 of the feed pipe into the distribution chamber 43 (see FIGS. 2 and 3). Here, the emulsion will be deflected sideways and fill the distribution chamber 43 entirely before it slowly flows upwards through the slot-like passage 48 into the upper portion of the separation chamber 37, where previously separated petroleum floats as a continuous layer P (at a level defined by the overflow outlet 13) on the previously separated water. This flow of emulsion into the chamber 37 proceeds very slowly, and the emulsion will therefore propagate horizontally and form a thin layer E between the petroleum layer P and the water. The formation of such a layer is facilitated by the guiding function of the horizontal sheet portion 47 adjacent the inlet passage 48. In addition thereto the emulsion being fed into the chamber has a slightly higher temperature than the temperature of the liquid which has been supplied previously and has therefore become cooler than the emulsion now being fed from the feed container. The difference in temperature results in a corresponding increase of the difference in density (specific weight) and, consequently, the emulsion is inclined to float on the previously separated water.

Due to the steady, slow feeding process and the above-mentioned measures facilitating the formation of an emulsion layer, the latter will be kept together during the entire feed period. Moreover, the feeding process is adjusted in such a way that the feeding is interrupted before the frontal end of the emulsion layer E reaches the end wall 39. Of course, the emulsion layer E has a certain inertia due to its forward motion and, therefore, the propagation is only gradually reduced to stagnancy. The horizontal perforated metal sheet 51 adjacent the end wall 39 has the purpose of counter-acting the tendency of the emulsion layer to deflect downwardly, in case the frontal end of the layer, in spite of the controlled feeding process, reaches the end wall 39 at a certain, though rather low speed. The apertures in the metal sheet 51 enable the down-flow of the previously separated after being pushed forward by the emulsion layer.

During the following remainder of the stagnant period, the flow in the separation chamber 37 will be decreased more and more, and the thin, substantially continuous emulsion layer E will self-separate during a relatively short period (about 20 min.), since the rising height within the layer is very low. Hereby, the lighter components of the emulsion are incorporated into the petroleum layer P, while the water content is intermixed with the previously separated water.

Each time a new quantity of emulsion is delivered through the passage 48, the top portion of the petroleum layer P is removed via the overflow outlet 13, while the separated water is discharged through the slot-like passage 57 between the container bottom wall 38 and the bottom wall portion 45 of the distribution chamber 52. The passage 57 is substantially parallel to the feed passage 48, whereby a uniform flow will be obtained.

In the auxiliary separation chamber 52, a further separation takes place in the liquid, which necessarily contains the remaining percentage of emulsion in the water. The water, which is removed via the outlet 15 will therefore contain less petroleum than the water removed via the outlet 14. Such a differentiated removal might be favourable in case the delivered emulsion contains an unexpectedly large petroleum percentage and cannot be separated sufficiently in the separation chamber 37 during the preset period of stagnation.

It has turned out that a certain secondary separation takes place in those emulsion portions which, in spite of the above-mentioned measured, are detached from the layer E and intermix with the previously separated water during the feed period. Thus, water containing a somewhat larger petroleum percentage is gathered in a wedge-shaped (as seen in cross-section, FIG. 3) region E', where the liquid is practically stagnant during the feed period as well as the stagnant period. The water below the wedge-shaped region E' will release some of its remaining petroleum contents into this region E' before it is discharged through the passage 57. At the same time, emulgated petroleum is successively emitted from the portion of the region E' adjacent the feed passage 48 and incorporated, at least partly, into the emulsion layer E flowing into the container.

Naturally, a number of modifications and changes can be made within the scope of the inventive idea presented in the claims.

I claim:

1. In a method for separating emulsions containing water, an emulsifying agent, petroleum products and possible contaminants, such method including feeding an emulsion through an inlet into at least one separation chamber containing previously separated water and a layer floating thereon, said layer including previously separated petroleum products; allowing said emulsion to self-separate under the influence of gravity, so that the lighter components thereof aggregate toward said layer, the uppermost part of which is successively removed, and the water component thereof intermixes with the previously separated water, which is successively discharged through an outlet opening at the bottom portion of the separation chamber; the improvement comprising:

feeding said emulsion through said inlet into said separation chamber under controlled horizontal laminar flow immediately below said layer;

simultaneously controlling the temperature of said emulsion being fed into said chamber so as to exceed the temperature of the previously separated water, so as to provide a density difference therebetween sufficient to enable said emulsion to propagate freely and horizontally into a thin, continuous emulsion layer floating between said petroleum layer and said previously separated water; and intermittently discontinuing the feed of said emulsion for time periods sufficient to permit said emulsion layer to self-separate while being substantially stagnant.

2. A method as claimed in claim 1, wherein said inlet through which said emulsion is fed into said separation chamber comprises an inlet passage, the opening of which is horizontal and extends laterally relative to the direction of inlet flow.

3. A method as claimed in claim 2, wherein the separated water is discharged from said separation chamber via an outlet passage situated below said inlet passage.

4. A method as claimed in claim 3, wherein said separated water is discharged via said outlet passage into an auxiliary separation chamber, from which the surface water and the bottom water are discharged via separate overflow outlets.

5. A method as claimed in claim 4, wherein said surface water in said auxiliary separation chamber is fed back and mixed with emulsion to be fed at said separation chamber.

6. A method as claimed in claim 1, wherein the feeding of said emulsion into said separation chamber is stopped at the latest when said emulsion layer reaches the nearest opposite wall of said separation chamber, whereby said emulsion layer is permitted to self-separate during a period of stagnation.

7. A method as claimed in claim 1, wherein said emulsion is simultaneously fed into a plurality of separation chambers arranged one on top of the other, a substantially equal amount of emulsion being fed into each separation chamber via separate feed pipes.

8. A method as claimed in claim 7, wherein said emulsion is fed via said separate feed pipes from a common feed container placed above said separation chambers.

9. A method as claimed in claim 8, wherein said emulsion is heated in said feed container.

10. A method as claimed in claim 9, wherein said temperature of said emulsion in said feed container, by means of thermostatic control, is maintained within a temperature range such that the difference between the limits of said temperature range is less than the reduction of the temperature of said emulsion while being fed into and self-separating in said separation chambers.

11. A method as claimed in claim 1, wherein said emulsion is fed into said separation chamber under control, wherein each preset but adjustable feed period is followed by a preset but adjustable idle period.

12. In a device for separating emulsion containing water, an emulsifying agent, petroleum products and possible contaminants, said device being of the type including at least one separation chamber having an inlet; means for feeding through said inlet an emulsion containing water, an emulsifying agent, petroleum products and possible contaminants; said separation chamber having means for removal from said separation chamber of the uppermost part of a petroleum layer floating on previously separated water and receiving lighter components of said emulsion upon separation of the latter under the influence of gravity; and an outlet opening at the bottom portion of the separation chamber for successive removal of the previously separated water; the improvement comprising;

said inlet of said separation chamber being situated immediately below the level of said means for removal of the uppermost part of said petroleum layer and comprising means for feeding said emulsion into said separation chamber under controlled horizontal laminar flow immediately below said layer;

an inner space of said separation chamber at the level of said inlet being substantially free of obstruction; heating control means, associated with said feeding means, for controlling the temperature of said emulsion being fed into said separation chamber so as to exceed the temperature of the previously separated water, so as to provide a sufficient density difference therebetween to cause said emulsion flowing into said chamber to propagate freely and horizontally into a thin, continuous emulsion layer floating between the petroleum layer and the previously separated water; and means associated with said feeding means, for intermittently discontinuing the feed of said emulsion through said feeding means for time periods sufficient to permit said emulsion layer to self-separate while being substantially stagnant.

13. A device as claimed in claim 12, further comprising a distribution chamber, said distribution chamber having a passage opening constituting said inlet, said passage opening being horizontal and extending laterally relative to the inlet flow direction.

14. A device as claimed in claim 13, wherein said distribution chamber is disposed adjacent to and extends along one side wall of said separation chamber.

15. A device as claimed in claim 14, wherein said inlet passage is situated at an upper portion of said distribution chamber and is formed as a slot extending parallel with and along the full length of said side wall.

16. A device as claimed in claim 15, wherein said outlet opening of said separation chamber for separated water is formed by a slot-like passage under a bottom wall of said distribution chamber, said outlet passage extending parallel with and substantially along the full length of said side wall.

17. A device as claimed in claim 16, wherein said outlet opening of said separation chamber communicates with an auxiliary separation chamber.

18. A device as claimed in claim 17, wherein said auxiliary separation chamber includes a first overflow outlet disposed slightly below the level of said removal means, said first overflow outlet of said auxiliary separation chamber being adapted for the discharge of an upper surface layer of water from said auxiliary separation chamber, and a lower outlet opening.

19. A device as claimed in claim 18, wherein said lower outlet opening of said auxiliary separation chamber communicates with a second overflow outlet disposed at the same level as said first overflow outlet of said auxiliary separation chamber.

20. A device as claimed in claim 19, comprising a plurality of separation chambers each having an associated distribution chamber and auxiliary separation chamber, arranged as box-like separation units one on top of the other, each of said units having a separate feed pipe and separate overflow outlets and removal means for separated water and separated petroleum, respectively.

21. A device as claimed in claim 20, wherein said separate feed pipes are connected to a common feed container positioned above said box-like separation unit and containing the emulsion to be separated.

22. A device as claimed in claim 21, wherein said feed pipes have open ends situated at the same level in said feed container; further comprising a time-controlled pump means for pumping said emulsion into said feed container during a preset but adjustable feed period, so that the emulsion surface rises above said level and flows freely into said feed pipes and thus into each of said separation units, and for stopping pumping thereafter until a preset but adjustable idle period is completed, said idle period corresponding essentially to the time period required for the respective layers of emulsion to self-separate.

23. A device as claimed in claim 22, wherein said heating means is positioned in said feed container.

24. A device as claimed in claim 23, wherein said heating means is thermostatically controlled in response to the temperature of the emulsion in said feed container, a temperature sensor member being situated slightly below said level of said open upper ends of said feed pipes.

25. A device as claimed in claim 24, wherein said pump means is thermostatically controlled so as to operate only when the temperature of the emulsion falls within a preset but adjustable temperature interval.

26. A device as claimed in claim 25, wherein said thermostatically controlled heating means is adapted to maintain the temperature of the emulsion in said feed container within a temperature range such that the difference between the limits of said range is less than the total reduction of the emulsion temperature while the emulsion is fed into and self-separates within the respective separation units.

27. A device as claimed in claim 12, further comprising at least one perforated plate horizontally disposed slightly below the level of said inlet adjacent at least one wall portion defining said separation chamber.

28. A device as claimed in claim 12, wherein said separation chamber is substantially parallelepipedic with greater horizontal than vertical dimension.

* * * * *